Haslet & Devitt,
Bedstead Fastening,
№ 4,508.  Patented May 9, 1846.
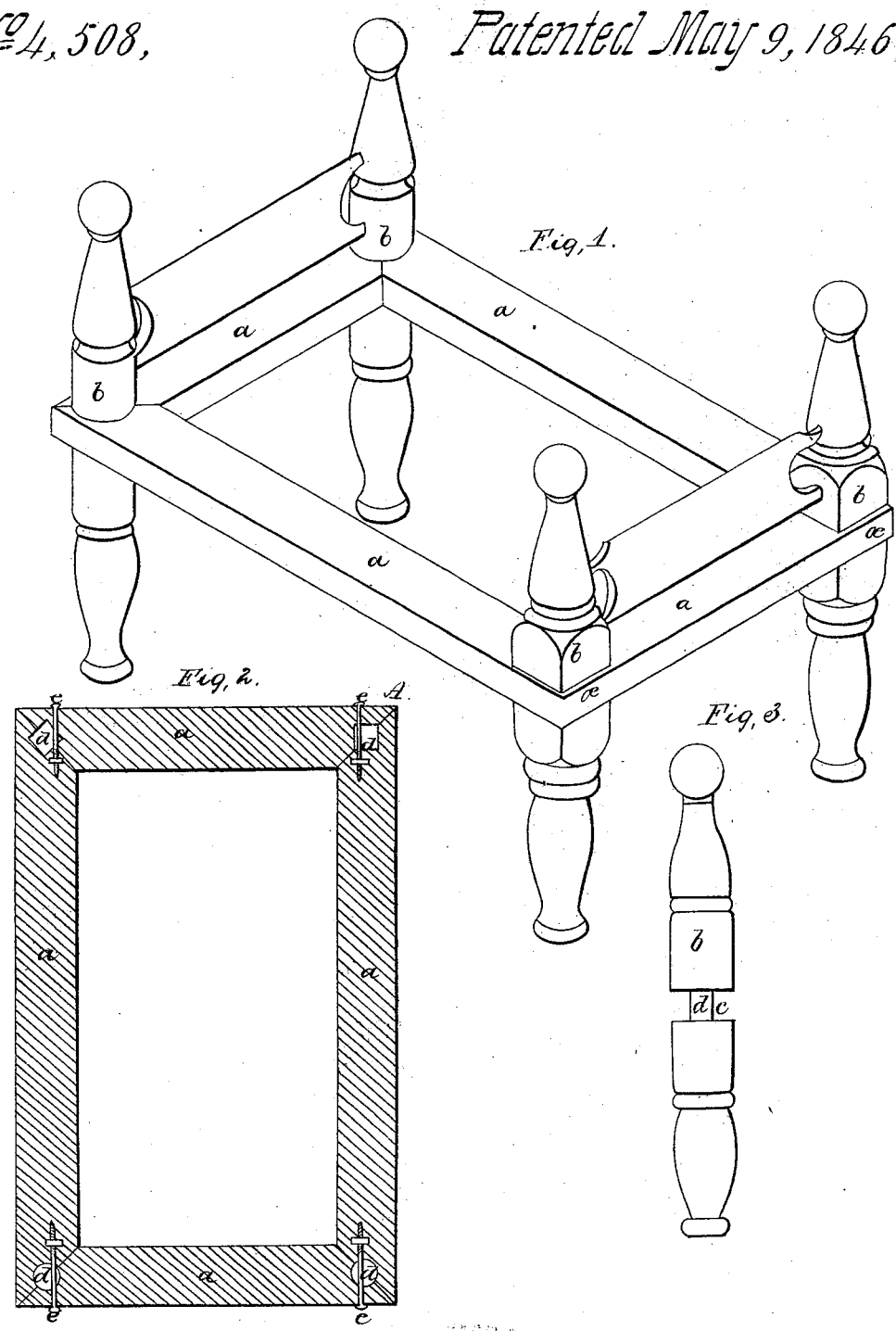

UNITED STATES PATENT OFFICE.

JOHN HASLET AND CORNELIUS DEVITT, OF IRVILLE, OHIO.

BEDSTEAD-FASTENING.

Specification of Letters Patent No. 4,508, dated May 9, 1846.

*To all whom it may concern:*

Be it known that we, JOHN HASLET and CORNELIUS DEVITT, of Irville, in the county of Muskingum and State of Ohio, have invented a new and useful Improvement in the Method of Connecting and Fastening the Rails and Posts of Bedsteads, and that the following is a full, clear, and exact description of the principle or character thereof which distinguishes it from all other things before known and of the manner of making, constructing, and using the same, reference being had to the accompanying drawings, making part of this specification, in which—

Figure 1 is a perspective representation of a bedstead, and Fig. 2, a horizontal section taken through the rails and posts.

The same letters indicate like parts in all the figures.

The nature of our invention consists in connecting the rails with each other with miter joints which embrace a round or square part of the posts which are notched or grooved to receive the mitered joints of the rails, the whole being then secured by a screw for each post which passes through the two rails at their junction and through that part of the post embraced by the miter joint, the said screw being parallel with one of the rails and therefore crossing the miter at an angle of forty five degrees, and that part of the post embraced by the rails, if square, having two of its sides parallel with the miter joint and the other two at right angles thereto, so that when the whole is put together and the screw inserted they cannot be separated without previously removing the screw, for the rails cannot be separated from the post except by drawing them in a line at right angles with the miter and this would necessarily break the screw which crosses this line at an angle of forty five degrees, and the same thing will take place if that part of the post which is embraced by the rails be round although in a manner not so effectual as if made square.

In the accompanying drawings (*a*) represents the rails and (*b*) the posts which are notched or grooved as at (*c*) in Fig. 3, the reduced portion (*d*) being left either round or square. The rails, where they come together and enter the groove or notch in the post, are mitered and the miter joints are cut out to embrace the part (*d*) of the post, and if this part (*d*) be square two of the faces must be parallel with the miter and the other two at right angles. A screw (*e*) is then inserted in a line parallel with one of the rails, and passing through the end of one of them, through the post, and into the other rail, thus binding and holding the whole together. By reference to joint (A) of Fig. 2 which represents the faces of the part of the post embraced by the mitered joint of the rails as forming an angle of forty-five degrees with the miter, it will be seen that the screw does not secure the whole together for it is parallel with two of the faces of the square of the post, and the direction of the pull to separate one of the rails from the post would be the same as that for separating it from the screw and therefore the screw only connects and holds together the posts and one of the rails instead of the two.

What we claim as our invention and desire to secure by Letters Patent, is—

The method of fastening and holding together the rails and posts of bedsteads by means of the miter joints of the rails let into and embracing the posts in the manner herein described, in combination with the screws or other fastenings inserted in a line parallel with one of the rails and that part of the post embraced by the miter being either round or square, or nearly so; and if square, the faces being at right angles to and parallel with the miter, for the purpose and in the manner herein described.

JOHN HASLET.
CORNELIUS DEVITT.

Witnesses:
THOS. O. HEASE,
HARRIS S. FERRY.